US008724766B2

(12) United States Patent
Jensen

(10) Patent No.: US 8,724,766 B2
(45) Date of Patent: May 13, 2014

(54) COMPRESSION SLEEVES USABLE IN NUCLEAR REACTORS

(75) Inventor: Grant C. Jensen, Morgan Hill, CA (US)

(73) Assignee: General Electric Company, Schnectady, NY (US)

( * ) Notice: Subject to any disclaimer, the term of this patent is extended or adjusted under 35 U.S.C. 154(b) by 709 days.

(21) Appl. No.: 11/745,831

(22) Filed: May 8, 2007

(65) Prior Publication Data

US 2008/0279325 A1    Nov. 13, 2008

(51) Int. Cl.
*G21C 13/036* (2006.01)
(52) U.S. Cl.
USPC .......................................................... 376/203
(58) Field of Classification Search
None
See application file for complete search history.

(56) References Cited

U.S. PATENT DOCUMENTS

| | | | | |
|---|---|---|---|---|
| 3,406,986 | A | * | 10/1968 | Jennings ...................... 285/21.1 |
| 4,739,916 | A | * | 4/1988 | Ayres et al. .................. 228/107 |
| 4,786,090 | A | * | 11/1988 | Mott .......................... 285/332.3 |
| 5,297,187 | A | * | 3/1994 | Sodergren et al. ............ 376/203 |
| 5,615,239 | A | * | 3/1997 | Deaver et al. ................. 376/247 |
| 5,675,618 | A | * | 10/1997 | Amburn et al. ............... 376/203 |
| 5,918,911 | A | * | 7/1999 | Sims .............................. 285/13 |

FOREIGN PATENT DOCUMENTS

| | | | |
|---|---|---|---|
| JP | 1973-80356 | * | 7/1973 |
| JP | 50-031296 A | | 3/1975 |
| JP | 09-197084 A | | 7/1997 |
| JP | 09-289817 | * | 10/1997 |
| JP | 08-302882 | * | 11/1998 |
| JP | 11-125245 A | | 5/1999 |
| JP | 2006-204629 | * | 7/2006 |
| JP | 2008-032468 A | | 2/2008 |

OTHER PUBLICATIONS

Merriam-Webster's Collegiate Dictionary, Merriam-Webster, Inc., Springfield, MA (USA), ISBN: 0-87779-709-9 (Tenth Ed., 1999), p. 251.*
Merriam-Webster's Collegiate Dictionary, Merriam-Webster, Inc., Springfield, MA (USA) ISBN:0-87779-709-9 (Tenth Ed. 1999), p. 251.*
Office action issued in connection with JP Application No. 2010-185696, Mar. 12, 2013.

* cited by examiner

*Primary Examiner* — Jack W Keith
*Assistant Examiner* — Sean P Burke
(74) *Attorney, Agent, or Firm* — Harness, Dickey & Pierce, PLC

(57) ABSTRACT

A compression sleeve for use in BWR jet pump sensing line repairs is configured to maintain its physical characteristics in an operating nuclear reactor environment. The sleeve includes shaped ends to accommodate deformation and flow of the sleeve so as to form a seal between jet pump sensing line components. A mechanical coupling assembly for repairing a jet pump sensing line is configured to include the compression sleeve.

16 Claims, 6 Drawing Sheets

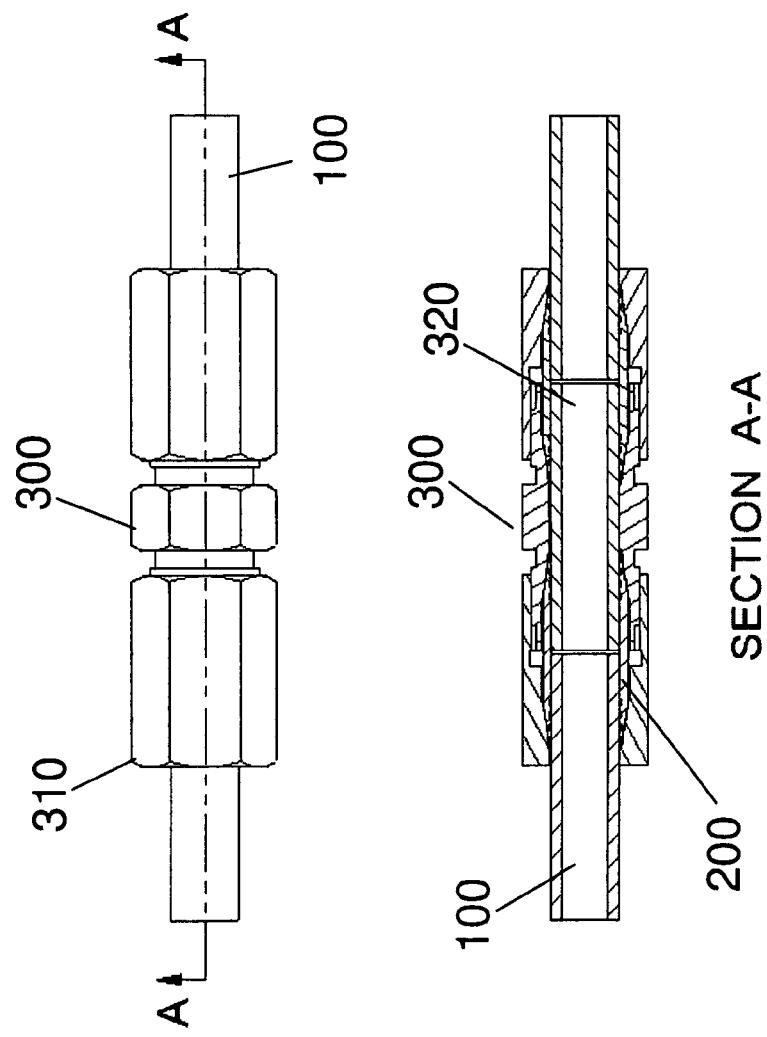

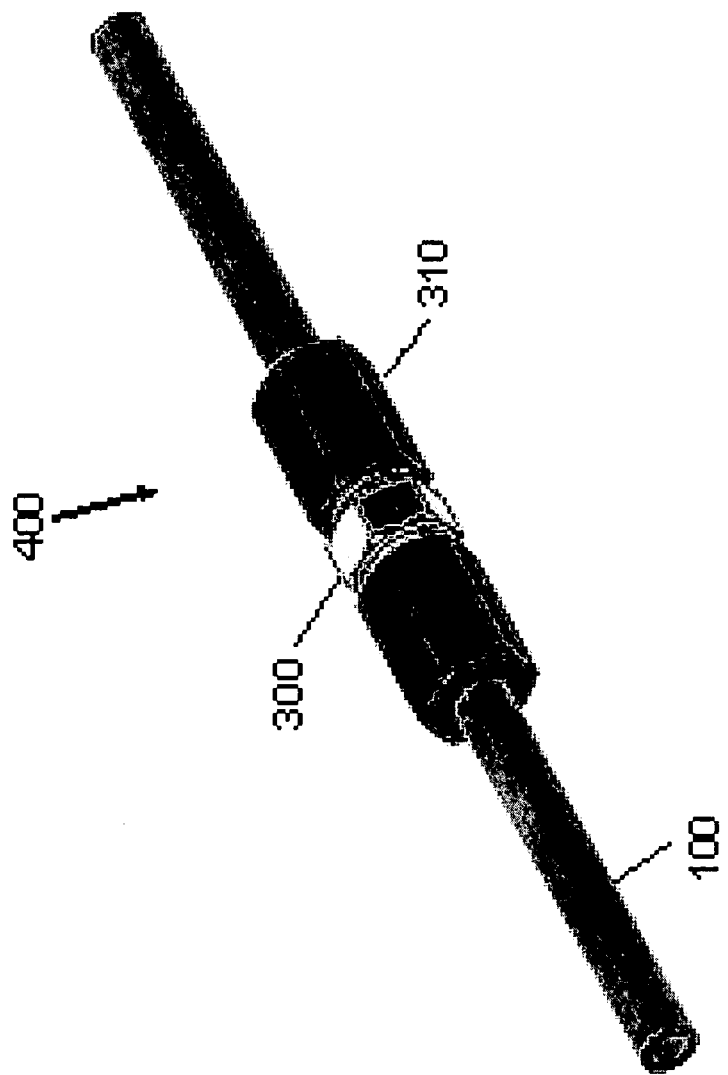

COMPRESSION SLEEVES USABLE IN NUCLEAR REACTORS

BACKGROUND

1. Field

Example embodiments generally relate to sleeves usable in nuclear reactors for piping and component repair and replacement, such as to repair and replace piping in a Boiling Water Reactor (BWR) and jet pump sensing lines in BWRs.

2. Description of Related Art

Generally, BWRs include jet pumps as part of a recirculation system to effectively move coolant and moderator through a nuclear core. In order to evaluate operating conditions within the nuclear core, it may be desirable to monitor the flow rate through the core, including flow rate of coolant from the jet pumps. Typically, a jet pump sensing line is used to measure flow rate from the jet pumps by measuring a pressure differential between the inlet and nozzle of the jet pumps.

FIG. 1 is an illustration of related art BWR jet pump nozzles with jet pump sensing lines coupled to a diffuser at the base of the jet pump nozzles. The jet pump sensing lines 100 are shown attached on a lower diffuser 110 of each of a plurality of jet pumps 150. The sensing lines 100 connect to various points on the jet pump 150 in order to measure pressure differentials. The sensing lines 100 are typically welded or otherwise integrally coupled with the diffuser 110 and as such can be subject to flow-induced vibration in the jet pump 150.

The jet pumps 150 are typically installed within a BWR and only accessible during scheduled plant outages for refueling and repair. These outages typically occur at several month intervals, and thus components within the core, including the jet pumps and jet pump sensing lines, must operate for lengthy periods before being inspected and/or repaired.

Further, BWR core operating conditions include high levels of radioactivity due to fission occurring in the fuel rods. Radioactivity, particularly the neutron flux generated in an operating nuclear reactor core, degrades the material strength and elasticity of core components over time. Components within the core, including jet pump sensing lines 100, are thus subject to premature brittling and cracking due to this radiation exposure. Accordingly, flow-induced vibration and lengthy operating cycles coupled with radiation can cause jet pump sensing lines to crack, rupture or otherwise fail, preventing an effective and/or accurate measurement of core flow rate within the core.

Related art jet pump sensing line repair mechanisms, for example, U.S. Pat. No. 5,752,807, involves replacing an entire failed jet pump sensing line, or using a slip-fit shrink memory alloy coupling, which must be specially fitted for the jet pump sensing line to be replaced.

SUMMARY

An example embodiment is directed to a compression sleeve for use in BWR jet pump sensing line repair. The sleeve includes shaped ends to accommodate deformation and flow of the sleeve so as to form a seal between jet pump sensing line components. A mechanical coupling assembly for repairing a jet pump sensing line is configured to include the compression sleeve.

BRIEF DESCRIPTIONS OF THE DRAWINGS

The present invention will become more apparent by describing, in detail, example embodiments thereof with reference to the attached drawings, wherein like elements are represented by like reference numerals, which are given by way of illustration only and thus do not limit the example embodiments herein.

FIG. 5 is a cross-sectional view of the assembly shown in FIG. 4.

FIG. 6 is an isometric view of a mechanical coupling assembly for installation in a BWR.

DETAILED DESCRIPTION

Figure 1:
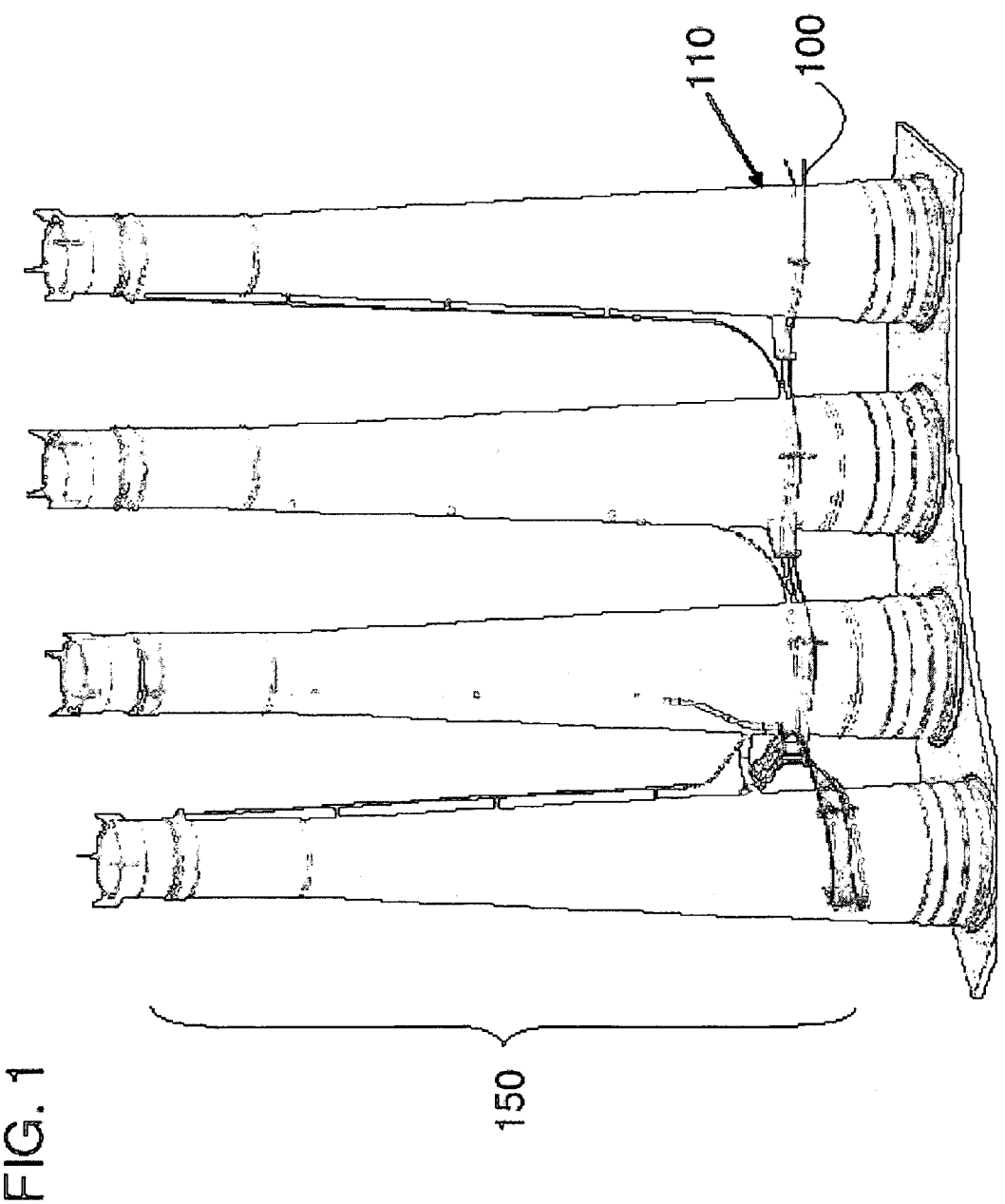
FIG. 1 is an illustration of related art BWR jet pump nozzles with jet pump sensing lines coupled to a diffuser on the base of the jet pump nozzles.
Figure 2:
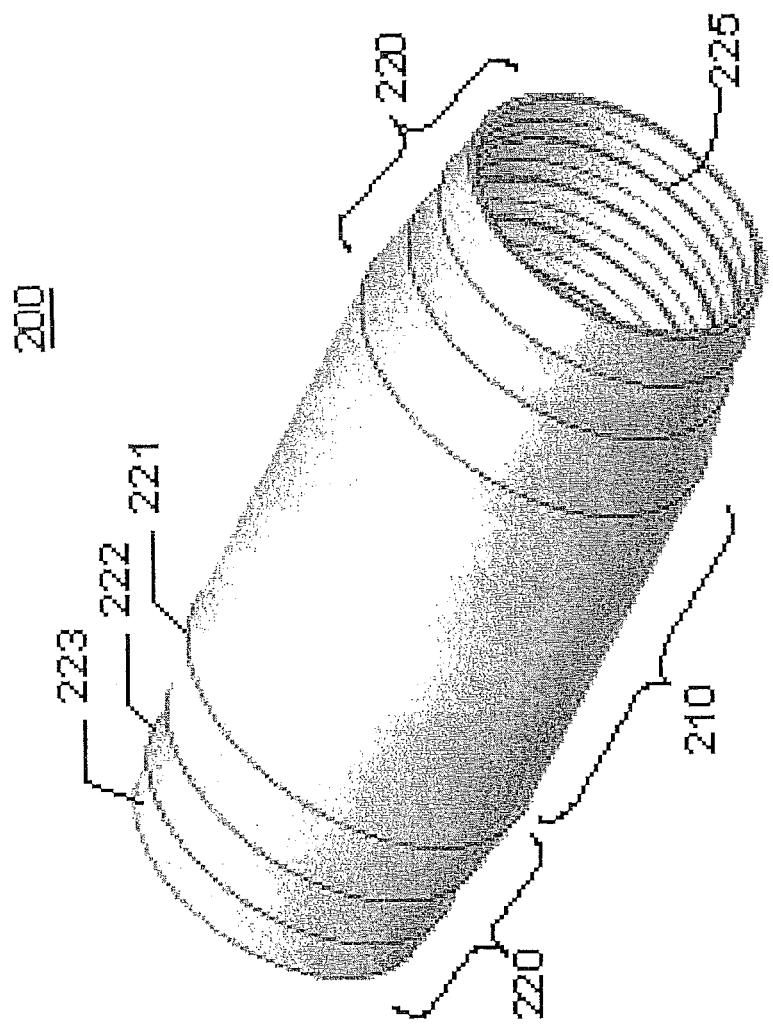
FIG. 2 is an isometric view of a compression sleeve in accordance with an example embodiment.

FIG. 2 is an isometric view of a compression sleeve in accordance with an example embodiment. The compression sleeve ("sleeve 200") may have a generally annular and/or cylindrical body 210. The inner diameter of the sleeve 200 cooperates with an outer diameter of a jet pump sensing line 100 segment outer diameter so that the sleeve 200 fits over a sensing line segment and/or a replacement segment. For example, if a sensing line 100 segment has an outer diameter of 0.55 inches, the inner diameter of the sleeve 200 may be slightly greater than 0.55 inches. The maximum outer diameter of the sleeve body 210 is configured to provide sufficient strength when used as a replacement segment.

The sleeve 200 includes two tapered ends 220, one at either end of the sleeve body 210. The tapered ends 220 are shaped to deform and provide a seal between sensing line 100 segments and/or replacement segments as the sleeve 200 is fastened thereto. The tapered ends 220 may also be configured to properly seat a fastening device that holds the sleeve 200 onto components of a sensing line during and after a repair evolution.

Figure 3:
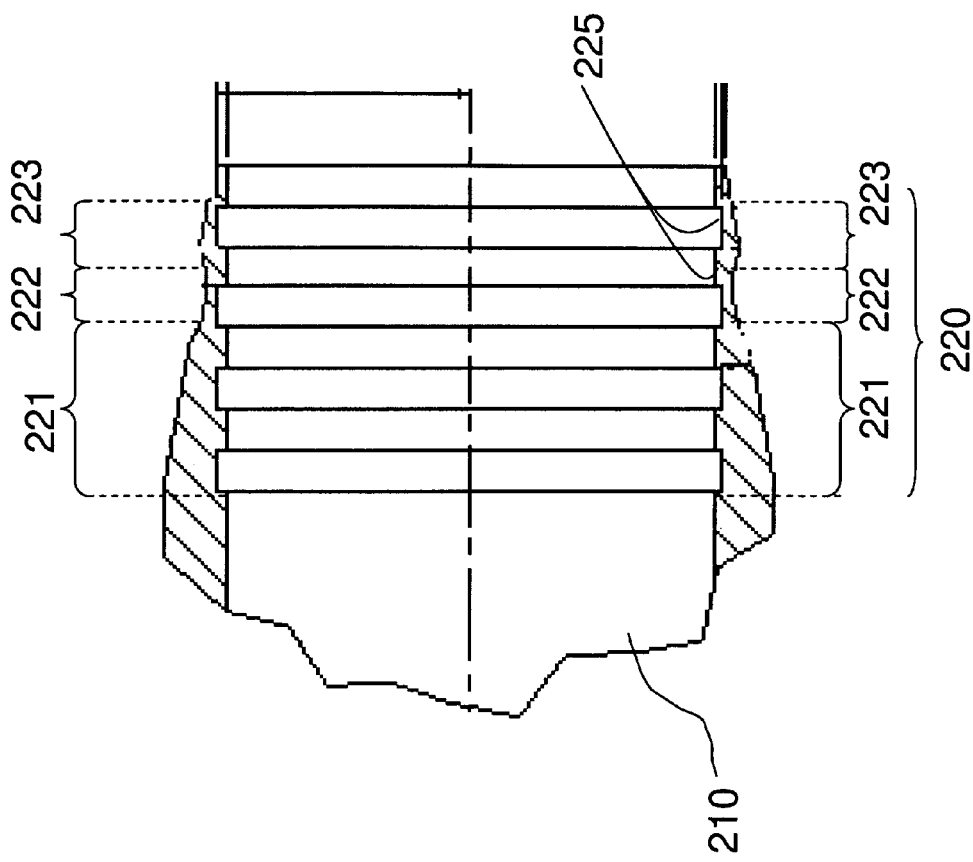
FIG. 3 is a cut-away view of sleeve in FIG. 2 showing inner and outer diameter features of the sleeve.

FIG. 3 is a cut-away view of sleeve 200 showing inner and outer diameter features. The tapered ends 220 include three sections 221, 222, 223 that enable the deforming and seating configuration discussed above. The first section 221 is closest to the sleeve body 210. As can be seen in FIG. 3, the first section 221 has the greatest maximum thickness and is generally continuous with the sleeve body 210 where the first section 221 joins the body 210. The first section 221 may be tapered such that its outer diameter and thickness continuously decrease with linear distance away from the sleeve body 210; its inner diameter remains constant. The first section 221 may be fabricated so as to be increasingly more resistant to deformation under pressure from a fastening device and/or to impede further progression of a fastening device such as a nut and collar along the sleeve 200 due to its increasing thickness. In this way, the first section 221 may properly seat a fastening device used in a sensing line repair.

The second section 222 is adjacent to and generally continuous with the first section 221. The second section 222 may be shaped to deform and flow under the compressive forced exerted by a fastening device. As shown in FIG. 3, the second section 222 may be generally concave when viewed in profile. The concave shape may allow a fastening device such as a collar and/or nut to readily fit over and collapse the second section 222, such that the material in the second section 222 deforms to enhance sealing.

The third section 223 is adjacent the second section 222 and is farthest from the sleeve body 210. As shown in FIG. 3, the third section 223 is generally continuous with the second section 222 and tapers at about the same angle from horizontal as the first section 221, although the third section 223 may not be coplanar with the first section 221. For example, the first section 221 and third section 223 may taper at an approximately 10-degree angle with a horizontal axis of rotation of the sleeve body 210. The third section 223 has the smallest minimum thickness of each of the three sections 221-223, and, like the first section 221, may be increasingly resistant to deformation and flow as its thickness increases. Unlike the first section 221, the entire third section 223 may be deformed and distorted to provide a seal between sensing line 100 components. In this way, fastening devices are impeded by the thickest end of the third section 223 but can extend beyond the thickest end to be properly seated against the first and second sections 221 and 222.

Alternatively, the tapered ends 220 may take any shape which facilitates a seal and/or component seating when used in a sensing line 100 repairs. For example, the ends 220 can have any number of sections shaped to provide deformation and seating at different rates or displacements along the ends 220.

The tapered ends 220 may be configured to prevent fretting, or separation and tearing, of any part of the sleeve during installation and operation. As shown in FIGS. 2 and 3, the inner surface of each tapered end 220 has a stepped or crenulated pattern 225. The pattern 225 has a maximum depth small enough to prevent fretting given the outside diameter of the tapered ends 220 and the compressive force applied thereto. The pattern 225 provides a labyrinth seal with sensing line repair components within the inner diameter of the sleeve 200, facilitating an improved seal as compared to that achieved through pure deformation and flow of the tapered ends 220.

The example sleeve 200 is fabricated from a material designed to maintain physical properties in an operating nuclear core environment. The materials may be generally malleable and/or elastic in order to properly compress and flow when used in a sensing line 100 repair. The materials have a minimum strength to maintain sensing line 100 integrity and resistance to radiation-induced material failure. Example materials include malleable metals, for example, ninety-nice percent (99%) heat-annealed Nickel (Ni). These materials are subject to heat-annealing at high temperatures (2000° F. and greater) in order to yield the desired malleability.

Figure 4:
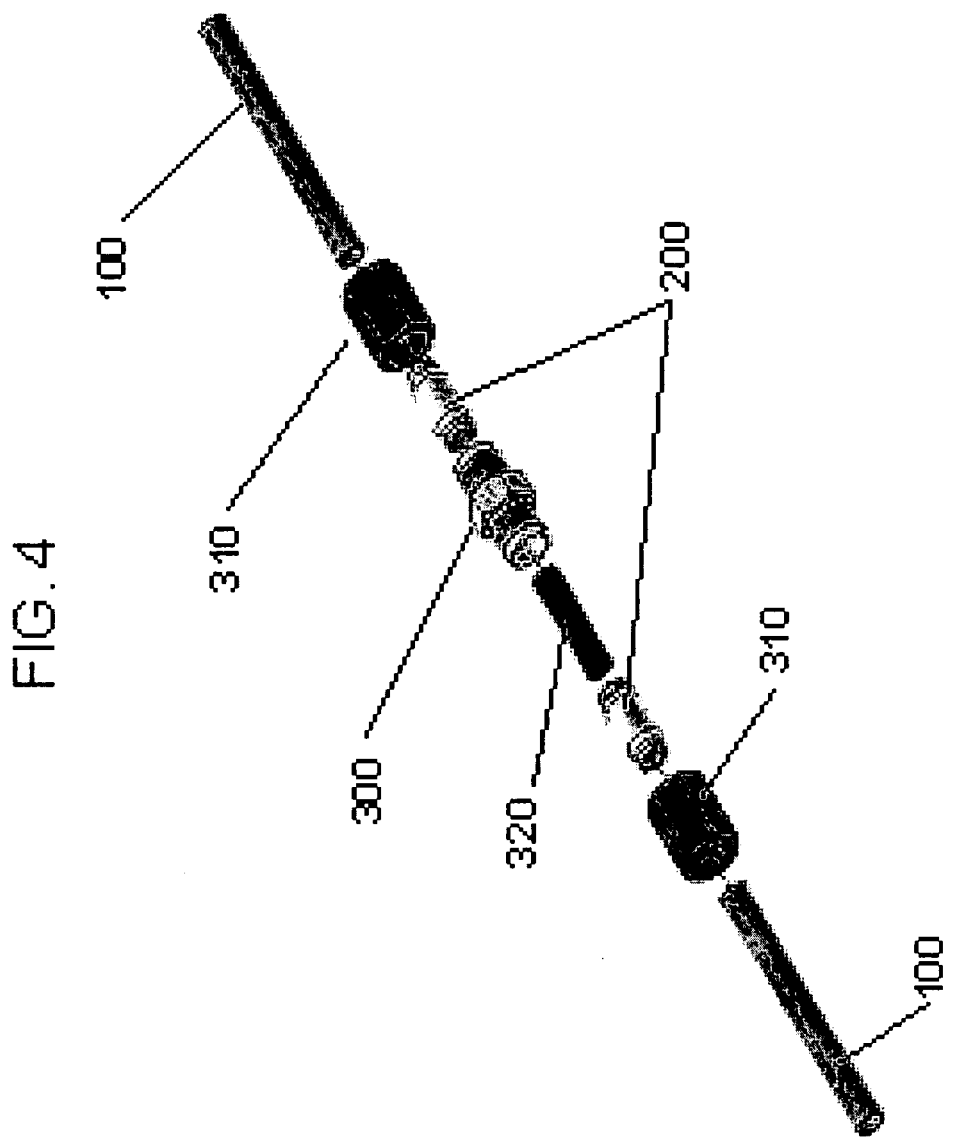
FIG. 4 is an exploded view of a jet pump sensing line repair assembly using a compression sleeve in accordance with an example embodiment.

FIG. 4 is an exploded view a mechanical coupling assembly using the compression sleeve in accordance with an example embodiment; and FIG. 5 is a cross-sectional view of the assembly shown in FIG. 4. The mechanical coupling assembly 400 includes the compression sleeve 200, a replacement tube 320 and a fastening means such as a collar 300 and nut 310. The replacement tube 320 is designed to replace a segment of a jet pump sensing line 100 and to abut the remaining ends of the sensing line 100 after the segment is removed.

As shown in FIG. 5, when completely installed, the sleeves 200 fit over the two abutting portions of the sensing line 100 and the replacement tube 320. The collar 300 and compression nut 310 are then fit over the sleeves 200 and replacement tube 320. As the compression nut 310 is advanced onto the collar 300, the collar 300 and compression sleeves 200 are compressed against the sensing line 100 and the replacement tube 320. With increased compressive force, the sleeve 200 begins to deform. The ends 220 of the sleeve 200 thus deform and flow under the nut 310 and/or collar 300 to provide a seal with the sensing line 100 or replacement tube 320. The nut 310 is then seated against the sleeve end 220 which is thicker to prevent further deformation and nut 310 progress. An is isometric view of the mechanical coupling assembly 400 is shown in FIG. 6.

The example embodiments can be varied in many ways and still achieve repair of a jet pump sensing line 100. For example, the shape of the collar 300 and compression nut 310 can be varied to fit different configurations or seat differently against the compression sleeve 200. Further, several different sensing line 100 sizes can be accommodated by varying the inner diameter of one or more components in the mechanical coupling assembly 400. Such variations are not to be regarded as departure from the spirit and scope of the exemplary embodiments, and all such modifications as would be obvious to one skilled in the art are intended to be included within the scope of the following claims.

What is claimed is:

1. A compression sleeve useable in a nuclear reactor, comprising:
    a single-piece tubular body,
    the tubular body having a first end and a second end,
    the first end shaped to surround an end of a jet pump sensing line,
    the second end shaped to surround a replacement line portion for the jet pump sensing line,
    at least one of the first and second ends being a tapered, malleable end configured to deform to provide a seal between the compression sleeve and the respective jet pump sensing line or replacement line portion,
    the tapered, malleable end having a first, second, and third section, the second section having an outer surface with a concave, longitudinal cross-sectional profile, the second section being between the first and third sections, the longitudinal cross-sectional profile existing along a longitudinal length of the compression sleeve.

2. The sleeve of claim 1, wherein the jet pump sensing line and the replacement line portion are in a Boiling Water Reactor (BWR).

3. The sleeve of claim 1, wherein the tapered, malleable end includes grooves on an inner surface forming a crenulated pattern configured to form a labyrinth seal with the respective jet pump sensing line or the replacement line portion.

4. The sleeve of claim 1, wherein,
    thicknesses of each of the first, second, and third section are not equal and are configured to permit deformation of the first, second, and third sections while substantially preventing deformation to portions of the tubular body other than the first, second, and third sections.

5. The sleeve of claim 4, wherein
    the first section is closest to the tubular body and tapers continuously from the tubular body at an angle,
    the third section is farthest from the tubular body and tapers at about the same angle, and
    the concave cross-sectional profile of the second section is continuous between the first section and third section.

6. The sleeve of claim 1, wherein the tubular body has an inner diameter of about 0.01 inches larger than an outer diameter of a connected component.

7. The sleeve of claim 1, wherein the tubular body is made of about 99% nickel, and is heat annealed at about two-thousand (2000) degrees Fahrenheit for about 15 minutes.

8. A mechanical coupling assembly for repairing a sensing line of a jet pump in a nuclear reactor, comprising:
    a compression sleeve including,
        a single-piece tubular body,
        the tubular body having a first end and a second end, the tubular body being malleable, heat-annealed, and about 99% nickel, the first end shaped to surround an end of a jet pump sensing line;

a replacement tube, the second end shaped to surround the replacement tube, the first and second ends being tapered, malleable ends configured to deform to provide a seal between the compression sleeve and the respective jet pump sensing line and replacement tube, the tapered, malleable ends each having a first, second, and third section, the second section having an outer surface with a concave, longitudinal cross-sectional profile, the second section being between the first and third sections, the longitudinal cross-sectional profile existing along a longitudinal length of the compression sleeve;

a collar configured to join the compression sleeve and at least one of the replacement tube and the end of the jet pump sensing line; and at least one compression nut configured to mate with the collar to compress and collapse the concave second section of the compression sleeve against an outer surface of at least one of the replacement tube and the end of the jet pump sensing line.

9. The mechanical coupling assembly of claim 8, wherein the replacement tube replaces a segment of the sensing line.

10. A compression sleeve used in a pipe repair within a nuclear reactor, comprising:

a single-piece tubular body having a first end and a second end, wherein the tubular body is made of about 99% pure Nickel, the first end shaped to surround an end of a jet pump sensing line, the second end shaped to surround a replacement line portion for the jet pump sensing line; and a reduced-thickness, circumferential segment having an outer surface with a concave, longitudinal cross-sectional profile at each of the first and second ends to facilitate deformation of the ends when connected to one of the jet pump sensing line and the replacement line portion so as to provide a seal between the connected component and sleeve, the longitudinal cross-sectional profile existing along a longitudinal length of the compression sleeve.

11. The sleeve of claim 10, wherein one or both of the ends includes a plurality of spaced circumferential grooves on an inner surface forming a crenulated pattern configured to form a labyrinth seal with a component that is to be received therein.

12. The sleeve of claim 10, wherein each of the ends is a tapered section that forms a conical, angled seating surface at each end.

13. The sleeve of claim 12, wherein the conical, angled seating surface is at an approximately 10 degree angle with a horizontal axis of rotation of the sleeve.

14. The sleeve of claim 1, wherein the concave cross-sectional profile of the second section is configured to allow a fastening device to fit over and collapse the second section.

15. The sleeve of claim 1, wherein the second section is configured to compress and collapse against an outer surface of at least one of the replacement line portion and the end of the jet pump sensing line when a compression force is applied to the outer surface of the second section, the compression force being in a direction that is about perpendicular to the outer surface of the second section.

16. The sleeve of claim 10, wherein the reduced-thickness, circumferential segment is configured to compress and collapse against an outer surface of at least one of the replacement line portion and the jet pump sensing line.

* * * * *